(12) United States Patent
Nishimura et al.

(10) Patent No.: US 7,646,120 B2
(45) Date of Patent: Jan. 12, 2010

(54) AUTOMOTIVE ALTERNATOR

(75) Inventors: Shinji Nishimura, Tokyo (JP); Wakaki Miyaji, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/491,254

(22) Filed: Jul. 24, 2006

(65) Prior Publication Data

US 2007/0176501 A1 Aug. 2, 2007

(30) Foreign Application Priority Data

Jan. 31, 2006 (JP) ............................. 2006-022569

(51) Int. Cl.
*H02K 11/00* (2006.01)
*H02K 11/04* (2006.01)

(52) U.S. Cl. ................. 310/68 R; 310/68 D; 310/68 C; 310/51

(58) Field of Classification Search ............... 310/68 R, 310/68 D, 68 C, 51
See application file for complete search history.

(56) References Cited

U.S. PATENT DOCUMENTS

| | | | | |
|---|---|---|---|---|
| 4,712,029 | A * | 12/1987 | Nold ........................... | 310/71 |
| 4,791,349 | A * | 12/1988 | Minks ........................ | 323/266 |
| 4,894,746 | A * | 1/1990 | Mori et al. ................ | 361/275.4 |
| 5,041,776 | A * | 8/1991 | Shirata et al. ................ | 322/29 |
| 5,077,634 | A * | 12/1991 | Shirata et al. ............... | 361/502 |
| 5,159,524 | A * | 10/1992 | Hasegawa et al. ........... | 361/271 |
| 5,491,370 | A * | 2/1996 | Schneider et al. ............. | 310/54 |
| 5,623,389 | A * | 4/1997 | Sanada ..................... | 361/321.1 |
| 5,659,212 | A * | 8/1997 | DePetris .................... | 310/68 D |
| 5,814,909 | A * | 9/1998 | Yamada et al. ................ | 310/64 |
| 6,111,390 | A * | 8/2000 | Inaba et al. .................... | 322/28 |
| 6,613,263 | B2 * | 9/2003 | Kondo ......................... | 264/263 |
| 6,911,848 | B2 | 6/2005 | Vinciarelli | |
| 2002/0108566 | A1 * | 8/2002 | Becherucci et al. ......... | 118/400 |
| 2003/0030964 | A1 * | 2/2003 | Oohashi et al. ........... | 361/306.1 |
| 2003/0042808 | A1 * | 3/2003 | Keidar et al. .............. | 310/68 D |

(Continued)

FOREIGN PATENT DOCUMENTS

EP 1401080 A 3/2004

(Continued)

OTHER PUBLICATIONS

Sears et al., University Physics, 1984, Addison-Wesley Publishing, 6th Ed., pp. 539-540.*

*Primary Examiner*—Quyen Leung
*Assistant Examiner*—Alex W Mok
(74) *Attorney, Agent, or Firm*—Sughrue Mion, PLLC

(57) ABSTRACT

The automotive alternator according to the present invention includes: a case; a rotor that is disposed inside the case and that is fixed to a shaft; a stator that is disposed so as to surround the rotor and in which alternating current arises by means of a rotating magnetic field from the rotor; a rectifier that is disposed at an end portion of the shaft and that rectifies the alternating current that arises in the stator into direct current; and a noise preventing capacitor that is connected between a positive side and a negative side of the rectifier and that absorbs noise that arises during rectification into direct current by the rectifier, wherein a carbon resistor that suppresses current that flows to the noise preventing capacitor is connected to the noise preventing capacitor in series.

12 Claims, 10 Drawing Sheets

U.S. PATENT DOCUMENTS

| | | | |
|---|---|---|---|
| 2003/0042809 A1* | 3/2003 | Taniguchi et al. | 310/68 R |
| 2004/0051487 A1* | 3/2004 | Mokri et al. | 318/157 |
| 2004/0174081 A1* | 9/2004 | Einheuser et al. | 310/100 |
| 2005/0099228 A1* | 5/2005 | Akatsuka et al. | 330/66 |

FOREIGN PATENT DOCUMENTS

| | | |
|---|---|---|
| JP | 45-9698 | 5/1970 |
| JP | 56-101186 | 8/1981 |
| JP | 60-190130 | 9/1985 |
| JP | 02-013298 A | 1/1990 |
| JP | 02-119559 | 5/1990 |
| JP | 02-311200 A | 12/1990 |
| JP | 04-067779 | 3/1992 |
| JP | 04-337616 | 11/1992 |
| JP | 5-9023 | 2/1993 |
| JP | 07-261860 A | 10/1995 |
| JP | 2004-072984 A | 3/2004 |

\* cited by examiner

AUTOMOTIVE ALTERNATOR

BACKGROUND OF THE INVENTION

1. Field of the Invention

The present invention relates to an automotive alternator that includes a rectifier that rectifies alternating current that is generated in a stator into direct current.

2. Description of the Related Art

Examples of known conventional automotive alternators include automotive alternators that include: a rotor that is disposed inside a case and that is fixed to a shaft; a stator that is disposed so as to surround the rotor, in which alternating current is generated by a rotating magnetic field from the rotor; a rectifier that is disposed near an end portion of the shaft and that rectifies the alternating current that is generated by the stator into direct current; and a noise preventing capacitor that is disposed between a positive side and a negative side of the rectifier and that absorbs high-frequency noise that arises during rectification into direct current by the rectifier and adversely affects radio waves (see Patent Literature 1, for example).

Patent Literature 1

Japanese Utility Model Publication No. SHO 58-43423 (Gazette)

In the automotive alternator described above, since rectification ripple voltages arise in the rectifier, one problem has been that current flows through the noise preventing capacitor, and the service life of the noise preventing capacitor is shortened by the generation of heat by the noise preventing capacitor.

The generating capacity of automotive alternators has also increased in recent years, and impedance in connecting wiring between batteries and automotive alternators has also been reduced. For this reason, when an automotive alternator and a battery are finally connected electrically by connecting a negative terminal of the battery and a negative cable from a vehicle body, for example, another problem has been that an inrush current may flow through the noise preventing capacitor, giving rise to sparks between the negative terminal of the battery and a tip portion of the negative cable and degrading the negative terminal of the battery.

An additional problem has been that although abrupt commutation surge voltages can be suppressed by the noise preventing capacitor during rectification, new oscillating waveforms that adversely affect on-board electrical equipment arise.

SUMMARY OF THE INVENTION

The present invention aims to solve the above problems and an object of the present invention is to provide an automotive alternator in which service life of a noise preventing capacitor is lengthened by suppressing the quantity of heat generated by the noise preventing capacitor, and that also enables the occurrence of sparks arising at terminals of a battery to be suppressed by reducing inrush current to the noise preventing capacitor when electrically connecting the automotive alternator and the battery, and that also suppresses oscillating waveforms.

In order to achieve the above object, according to one aspect of the present invention, there is provided an automotive alternator including: a case; a rotor that is disposed inside the case and that is fixed to a shaft; a stator that is disposed so as to surround the rotor and in which alternating current arises by means of a rotating magnetic field from the rotor; a rectifier that is disposed at an end portion of the shaft and that rectifies the alternating current that arises in the stator into direct current; and a noise preventing capacitor that is connected between a positive side and a negative side of the rectifier and that absorbs noise that arises during rectification into direct current by the rectifier, the automotive alternator being characterized in that a resisting means that suppresses current that flows to the noise preventing capacitor is connected to the noise preventing capacitor in series.

Using an automotive alternator according to the present invention, service life of the noise preventing capacitor is lengthened by suppressing the quantity of heat generated by the noise preventing capacitor, and the occurrence of sparks arising at terminals of a battery can be suppressed by reducing inrush current to the noise preventing capacitor when electrically connecting the automotive alternator and the battery, and oscillating waveforms are also suppressed.

DETAILED DESCRIPTION OF THE PREFERRED EMBODIMENTS

Figure 1:
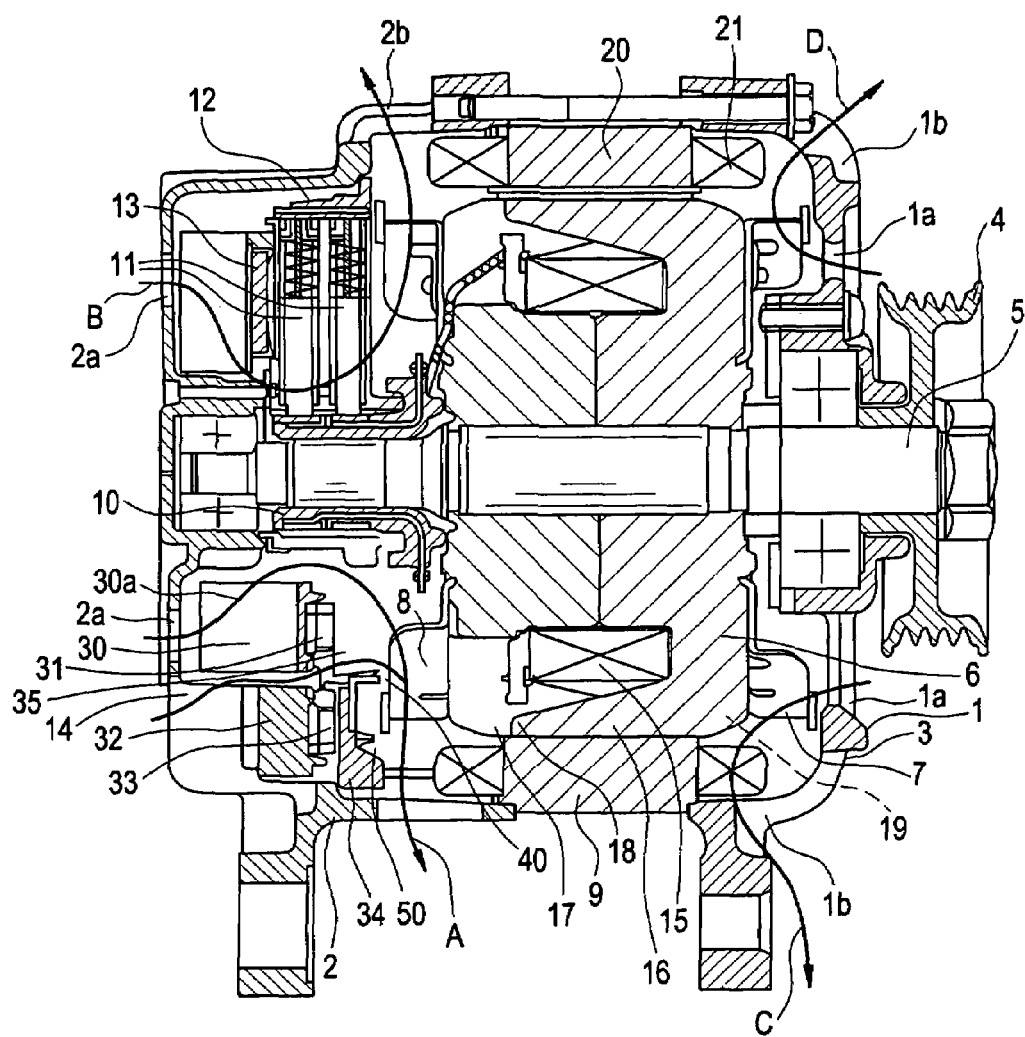
FIG. 1 is a cross section of an automotive alternator according to Embodiment 1 of the present invention.

Preferred embodiments of the present invention will now be explained based on the drawings, and identical or corresponding members and portions in the drawings will be given identical numbering.

Embodiment 1

Figure 2:
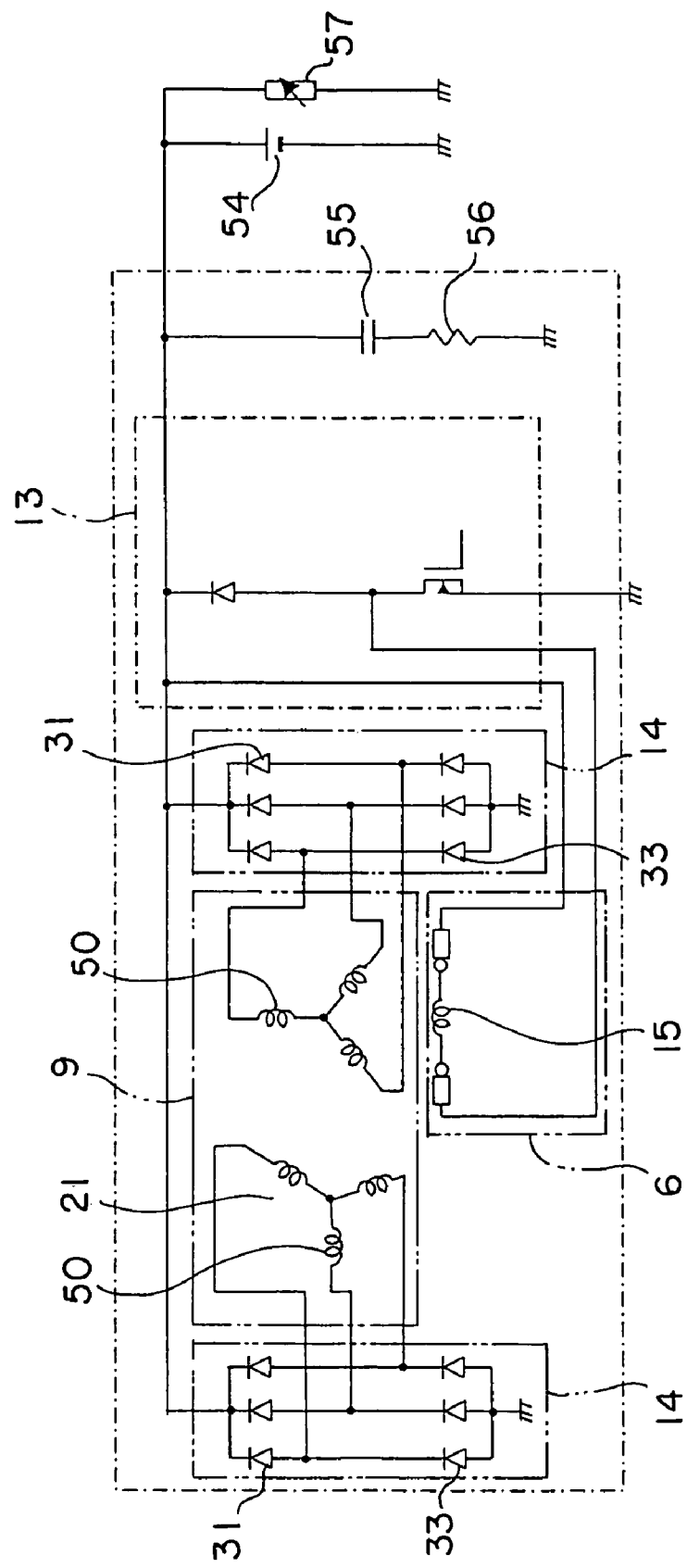
FIG. 2 is an electrical circuit diagram for the automotive alternator in FIG. 1.

FIG. 1 is a cross section of an automotive alternator (hereinafter simply "alternator") according to Embodiment 1 of the present invention, and FIG. 2 is an electrical circuit diagram for the alternator in FIG. 1.

In an alternator, a shaft 5 that has a pulley 4 fixed to a first end portion is rotatably disposed inside a case 3 that is constituted by a front bracket 1 and a rear bracket 2 that are made of aluminum. A Lundell rotor 6 is fixed to the shaft 5. A stator 9 is fixed to an inner wall surface of the case 3 around the rotor 6 so as to surround the rotor 6.

Slip rings 10 that supply electric current to the rotor 6 are fixed to a second end portion of the shaft 5. A pair of brushes 11 that are housed inside a brush holder 12 slide in contact with surfaces of the slip rings 10.

A voltage regulator 13 that adjusts magnitude of alternating voltage generated in the stator 9 is fixed to the brush holder 12. Rectifiers 14 that are electrically connected to the stator 9 so as to rectify alternating current into direct current are also disposed inside the rear bracket 2.

A plurality of front-end suction apertures 1a are formed on a radially-inner side of the front bracket 1 and a plurality of front-end discharge apertures 1b are formed on a radially-outer side. A plurality of rear-end suction apertures 2a are formed on a radially-inner side of the rear bracket 2 and a plurality of rear-end discharge apertures 2b are formed on a radially-outer side.

The above rotor 6 includes: a rotor coil 15 that generates magnetic flux on passage of electric current; a pole core that is disposed so as to cover the rotor coil 15; a front-end fan 7 that is fixed to an end surface of the pole core near the pulley 4; and a rear-end fan 8 that is fixed to an end surface on an opposite side of the pole core from the pulley 4. The pole core includes a front-end pole core body 16 and a rear-end pole core body 17 that are magnetized into North-seeking (N) poles and South-seeking (S) poles by the magnetic flux. The front-end pole core body 16 and the rear-end pole core body 17 have front-end claw-shaped magnetic poles 18 and rear-end claw-shaped magnetic poles 19, respectively, that are claw-shaped and intermesh with each other.

The above stator 9 includes: a stator core 20 through which a rotating magnetic field from the rotor 6 passes; and a stator coil 21 that is disposed radially inside the stator core 20. A plurality of slots that are formed so as to extend axially are disposed at a uniform pitch around an entire circumference radially inside the stator core 20, which is configured by laminating steel sheets.

As shown in FIG. 2, the stator coil 21 is constituted by two three-phase alternating-current windings in each of which three winding portions 50 are three-phase wye-connected, and the two three-phase alternating-current windings have a phase difference from each other.

The above rectifiers 14 include: a horseshoe-shaped aluminum first heat sink 30; rectangular parallelepipedic first unidirectional conducting element bodies 31 that are disposed on a front surface of the first heat sink 30 so as to be spaced apart circumferentially; a horseshoe-shaped aluminum second heat sink 32 that is disposed radially outside the first heat sink 30; rectangular parallelepipedic second unidirectional conducting element bodies 33 that are disposed on the second heat sink 32 so as to be spaced apart circumferentially; and a horseshoe-shaped circuit board that is disposed so as to cover the second unidirectional conducting element bodies 33.

A plurality of radiating fins 30a are formed in a radial pattern on a rear surface of the aluminum first heat sink 30. The first unidirectional conducting element bodies 31 are formed by insertion molding diodes using an insulating resin. A portion of a rear surface of the aluminum second heat sink 32 is placed in surface contact with the rear bracket 2. The second unidirectional conducting element bodies 33 are formed by insertion molding diodes using an insulating resin.

The circuit board 34 is formed by insertion molding a plurality of circuit board terminals 35. The first unidirectional conducting element bodies 31 and the second unidirectional conducting element bodies 33 are connected by the circuit board terminals 35 so as to constitute a bridge circuit. The stator coil 21 and the rectifiers 14 are also connected by the circuit board terminals 35.

Figure 3:
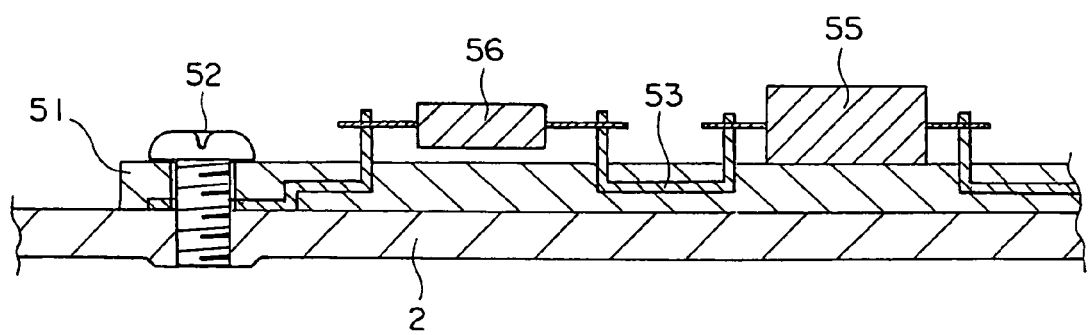
FIG. 3 is a partially-enlarged cross section of FIG. 1.

FIG. 3 is a partially-enlarged cross section of FIG. 1, wherein a flange 51 of the brush holder 12 is fixed to an inner wall surface of the rear bracket 2 using a screw 52. Connecting wiring 53 that is made of iron is embedded in resin flange 51. A first end portion of the connecting wiring 53 is electrically connected to the screw 52. A second end portion of the connecting wiring 53 is electrically connected to a battery 54 and the voltage regulator 13. A noise preventing capacitor 55 and a carbon resistor 56 that constitutes a resisting means are interposed in series on the connecting wiring 53. The noise preventing capacitor 55 has an electrostatic capacity value of 0.5 to 3.5 μF, and functions to absorb high-frequency noise that arises during rectification into direct current by the rectifier 14 and adversely affects radio waves.

There is no problem regarding noise absorbing function even if the carbon resistor 56 has a electrostatic capacity value that is greater than an upper limit of 3.5 μF, but it is set to 3.5 μF in order to prevent high costs and increases in physical volume.

Moreover, number 57 in FIG. 2 represents an electric load.

In an automotive alternator having the above configuration, electric current is supplied from the battery 54 through the brushes 11 and the slip rings 10 to the rotor coil 15, generating magnetic flux and giving rise to North-seeking (N) poles and South-seeking (S) poles in the front-end and rear-end claw-shaped magnetic poles 18 and 19, respectively.

At the same time, since the pulley 4 is driven by an engine and the rotor 6 is rotated by the shaft 5, a rotating magnetic field is applied to the stator core 20, giving rise to electromotive force in the stator coil 21.

Magnitude of the alternating-current electromotive force is adjusted by the voltage regulator 13, which adjusts current flowing to the rotor 6. Alternating current that is generated by the alternating-current electromotive force also passes through the rectifiers 14 and is rectified into direct current, and the battery 54 is charged.

Due to rotation of the rear-end fan 8 that is fixed to the end surface of the rotor 6, external air is drawn in near the rear bracket 2 through the rear-end suction apertures 2a, and as indicated by arrow A in FIG. 1, cools the rectifiers 14, then cools terminal connection portions 40 and coil ends of the stator coil 21, and is then discharged externally through the rear-end discharge apertures 2b. As indicated by arrow B in FIG. 1, external air also cools the voltage regulator 13, then cools the stator coil 21, and is then discharged externally through the rear-end discharge apertures 2b.

As indicated by arrows C and D in FIG. 1, near the front bracket 1, external air is also drawn in through the front-end suction apertures 1a, is deflected centrifugally by the front-end fan 7, cools coil ends of the stator coil 21, and is discharged externally through the front-end discharge apertures 1b.

In an alternator according to the above embodiment, the output voltage that has been rectified by the rectifier 14 fluctuates, and the noise preventing capacitor 55 absorbs high-frequency components in particular, but for that reason alternating current flows through the noise preventing capacitor 55. This noise preventing capacitor 55 is a dielectric, and loss that can be expressed as a dielectric loss factor occurs, generating heat.

However, because the carbon resistor 56 is connected to the noise preventing capacitor 55 in series in this alternator, the quantity of current flowing through the noise preventing capacitor 55 is reduced, suppressing the quantity of heat generated by the noise preventing capacitor 55.

Furthermore, when the alternator and the battery 54 are connected electrically by connecting a positive terminal of the battery 54 and the alternator, then connecting a negative terminal of the battery 54 and a negative cable (not shown) from a vehicle body (not shown), for example, the noise preventing capacitor 55 is charged by the battery 54 through the connecting wiring 53. Because the quantity of current in this charging current is limited by the carbon resistor 56 that has been connected to the noise preventing capacitor 55 in series, the occurrence of sparking between the negative terminal of the battery 54 and the tip portion of the negative cable is suppressed, reducing degradation of the negative terminal of the battery 54.

Because the carbon resistor 56, which is a heat-generating body, is disposed on the negative side of the noise preventing capacitor 55 in a vicinity of the grounded rear bracket 2, much of the heat that is generated by the carbon resistor 56 is discharged externally through the rear bracket 2.

The carbon resistor 56 and the noise preventing capacitor 55 can be mounted inside the case 3 simply by fixing the flange 51 of the brush holder 12, to which the carbon resistor 56 and the noise preventing capacitor 55 have been fixed in advance, to the inner wall surface of the rear bracket 2 using the screw 52.

Now, the present inventors have found the direct-current voltage after rectification in an alternator according to Embodiment 1 by conducting experiments.

The graphs shown in FIGS. 4 through 11 are graphs that show examples of the results of those experiments.

The horizontal axis is time and the vertical axis represents the voltage after rectification. The reason that the voltage is displayed so as to straddle zero is because measurements were made in an AC mode of an oscilloscope and direct current components have been cut out.

The experimental results in these examples are data from experiments performed under conditions in which the rotational frequency of the alternator was 5,000 rpm.

Figure 4:
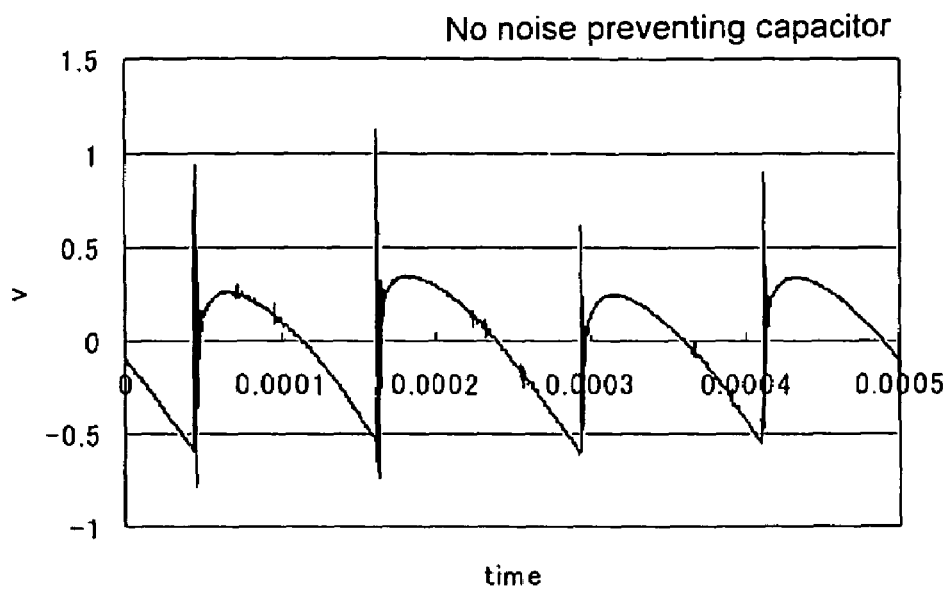
FIG. 4 is a waveform graph of direct-current voltage after rectification that the present inventors found by conducting experiments.

FIG. 4 shows an example in which there is no noise preventing capacitor 55 or carbon resistor 56.

Figure 5:
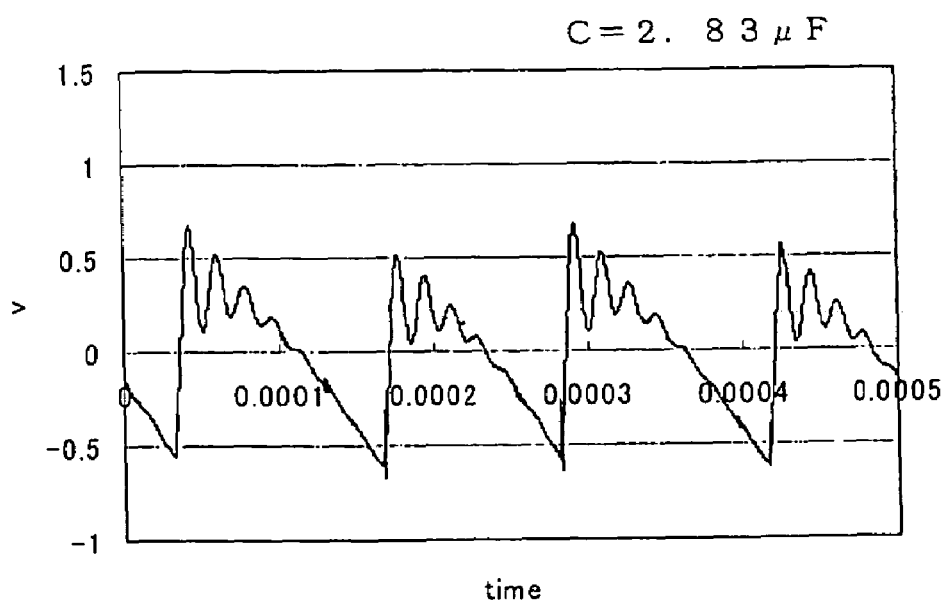
FIG. 5 is a waveform graph of direct-current voltage after rectification that the present inventors found by conducting experiments.

FIGS. 5 through 11 are all examples in which the electrostatic capacity C of the noise preventing capacitor 55 was 2.83 µF, and FIG. 5 shows a case in which the carbon resistor 56 had no value, and FIGS. 6 through 11 cases in which the resistance R of the carbon resistor 56 was 0.1 Ω, 0.2 Ω, 0.5 Ω, 0.7 Ω, 1.0 Ω, and 10.0 Ω, respectively.

As can be seen from FIG. 4, abrupt surge voltages occur when there is no noise preventing capacitor 55. In contrast to that, as shown in FIG. 5, it can be seen that although abrupt surge voltages do not occur if a noise preventing capacitor 55 is disposed, oscillating waveforms arise.

Figure 6:
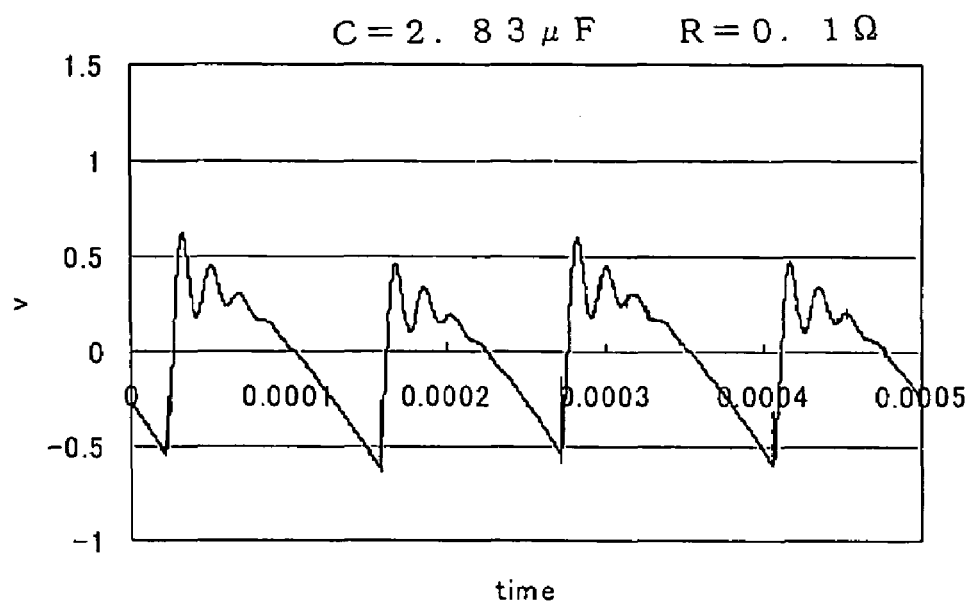
FIG. 6 is a waveform graph of direct-current voltage after rectification that the present inventors found by conducting experiments.
Figure 7:
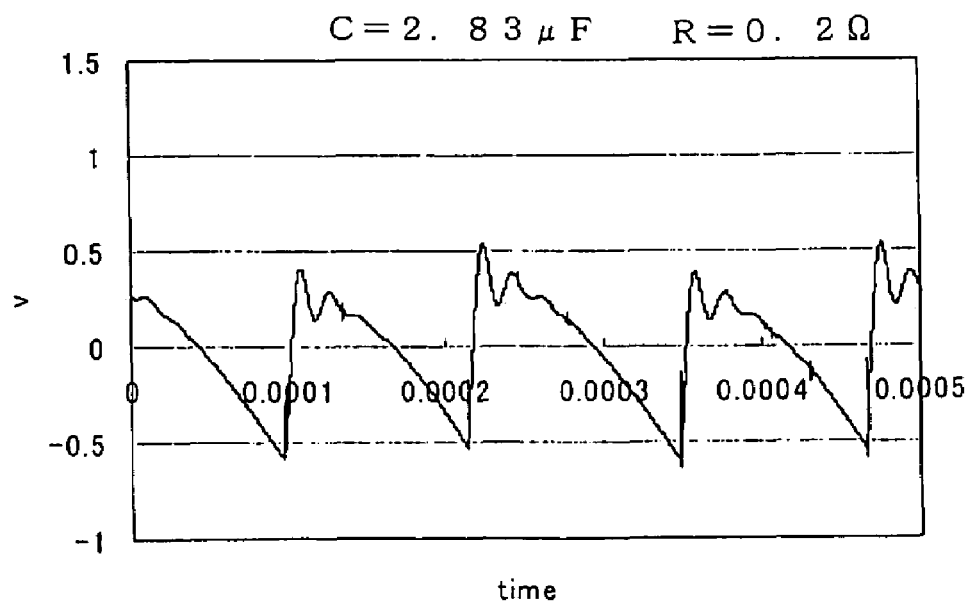
FIG. 7 is a waveform graph of direct-current voltage after rectification that the present inventors found by conducting experiments.
Figure 8:
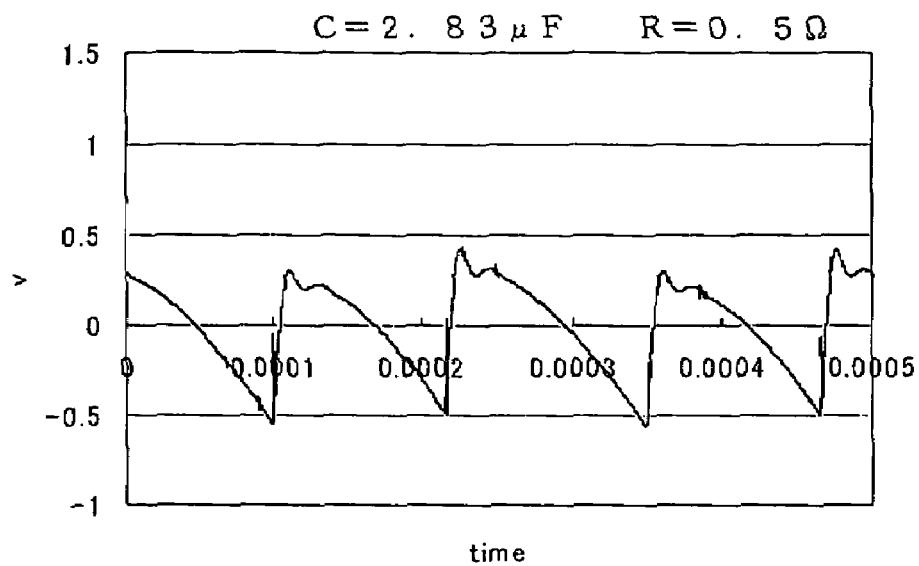
FIG. 8 is a waveform graph of direct-current voltage after rectification that the present inventors found by conducting experiments.
Figure 9:
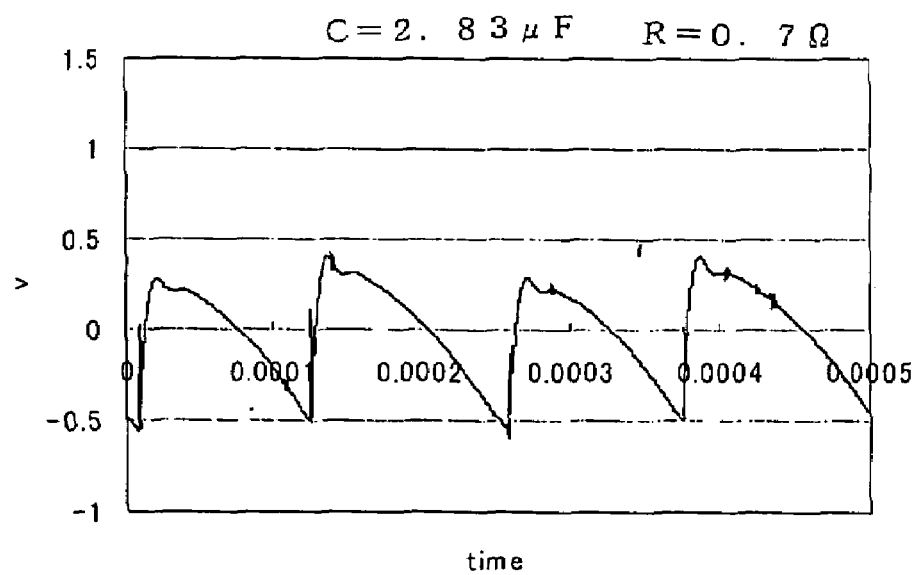
FIG. 9 is a waveform graph of direct-current voltage after rectification that the present inventors found by conducting experiments.
Figure 10:
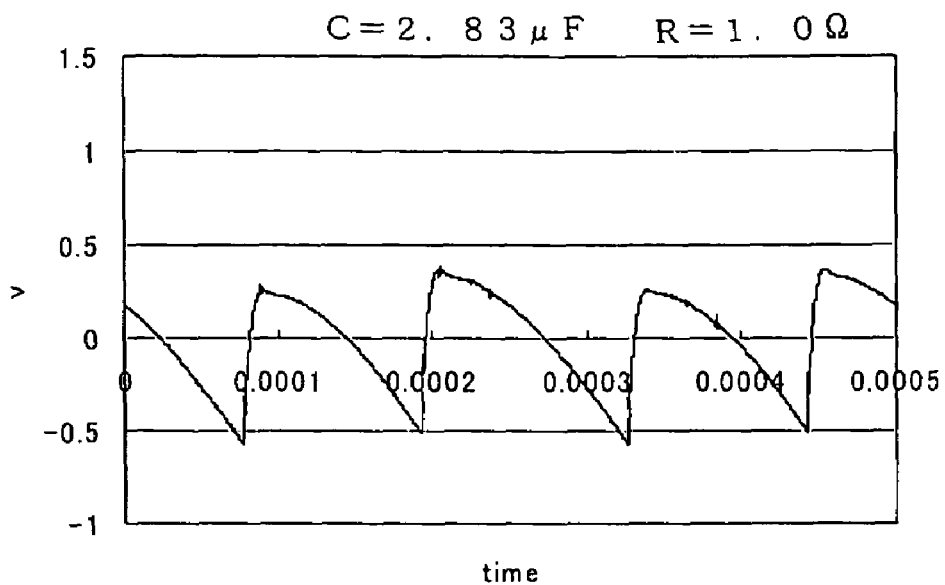
FIG. 10 is a waveform graph of direct-current voltage after rectification that the present inventors found by conducting experiments.
Figure 11:
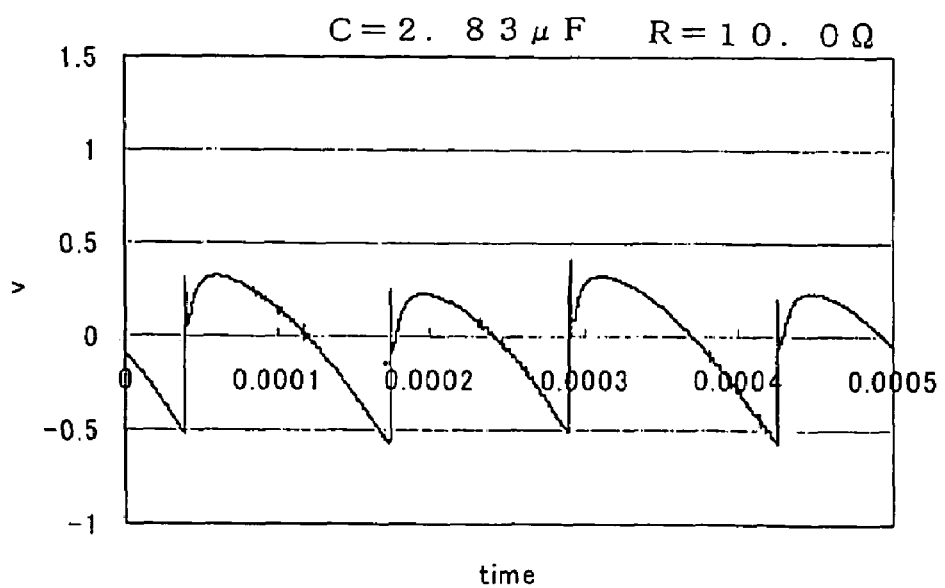
FIG. 11 is a waveform graph of direct-current voltage after rectification that the present inventors found by conducting experiments.

In FIG. 6 and each of the subsequent FIGS. 7 through 11, the resistance value R of the carbon resistor 56 is increased gradually, but although the magnitudes of the oscillating waveforms are reduced as that value is increased, abrupt surge voltages occur once again when the resistance value R is 10.0 Ω, albeit with lower values. It was found that if the resistance value R is greater than 10.0 Ω, the value of these surge voltages is also increased, and they become high-frequency noise that adversely affects radio waves.

The present inventors performed similar experiments changing the rotational frequency of the alternator to 2,000 rpm, 10,000 rpm, 15,000 rpm, and 18,000 rpm, and similar results were obtained to when the rotational frequency was 5,000 rpm.

It was also ascertained that the occurrence of abrupt surge voltages is suppressed when the noise preventing capacitor 55 has an electrostatic capacity C of 0.5 µF.

Embodiment 2

Figure 12:
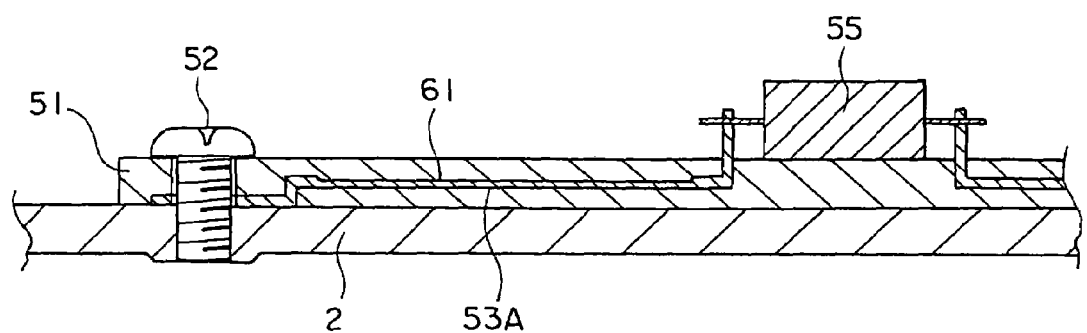
FIG. 12 is a partial cross section of an automotive alternator according to Embodiment 2 of the present invention.

FIG. 12 is a partial cross section of an alternator according to Embodiment 2 of the present invention.

In this embodiment, connecting wiring 53A differs from the connecting wiring 53 in the alternator according to Embodiment 1 in that it has a cross section reduced portion 61 in which cross-sectional area is small constituting a resisting means between the capacitor 55 and the screw 52, and in that the carbon resistor 56 is eliminated.

The rest of the configuration is similar to that of Embodiment 1.

This alternator has effects similar to those of the alternator according to Embodiment 1, and another effect is that the cross section reduced portion 61 of the connecting wiring 53A acts instead of the carbon resistor 56 according to Embodiment 1, eliminating the need for the carbon resistor 56, and removing the necessity to ensure space specifically for the carbon resistor 56.

Embodiment 3

Figure 13:
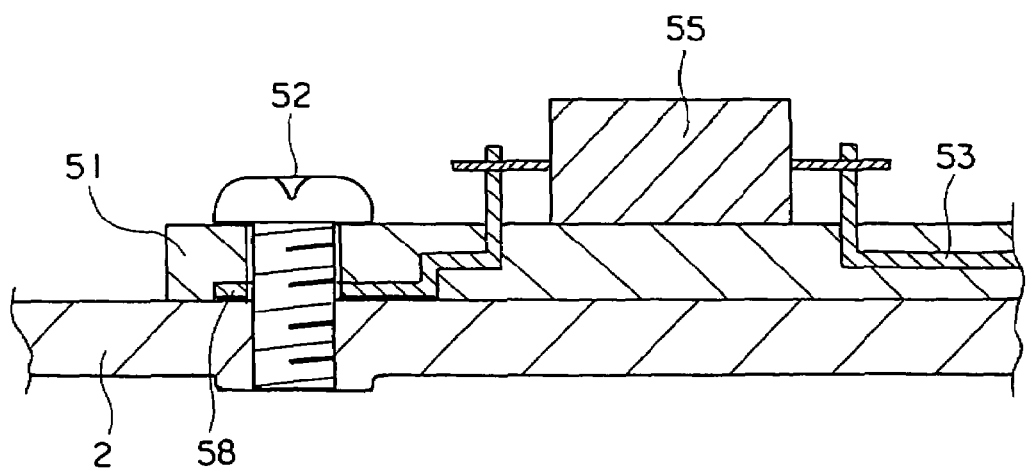
FIG. 13 is a partial cross section of an automotive alternator according to Embodiment 3 of the present invention.

FIG. 13 is a partial cross section of an alternator according to Embodiment 3 of the present invention.

In this embodiment, a resistive coating 58 that constitutes a resisting means is formed at an end portion of connecting wiring 53 near a screw 52 on a surface that is placed in contact with an inner wall surface of a rear bracket 2.

The rest of the configuration is similar to that of Embodiment 1.

This alternator has effects similar to those of the alternator according to Embodiment 1, and another effect is that the resistive coating 58 that is formed on the end portion of the connecting wiring 53 acts instead of the carbon resistor 56 according to Embodiment 1, eliminating the need for the carbon resistor 56, and removing the necessity to ensure space specifically for the carbon resistor 56.

Embodiment 4

Figure 14:
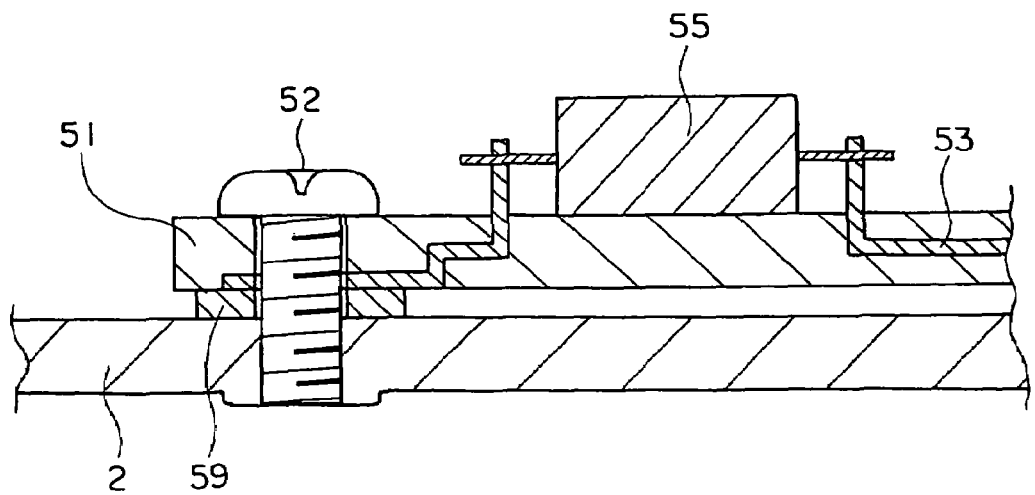
FIG. 14 is a partial cross section of an automotive alternator according to Embodiment 4 of the present invention.

FIG. 14 is a partial cross section of an alternator according to Embodiment 4 of the present invention.

In this embodiment, a ring-shaped carbon resistor 59 that constitutes a resisting means into which a screw 52 is inserted is interposed between an end portion of connecting wiring 53 near the screw 52 and an inner wall surface of a rear bracket 2.

The rest of the configuration is similar to that of Embodiment 1.

This alternator has effects similar to those of the alternator according to Embodiment 1, and another effect is that the ring-shaped carbon resistor 59 can be connected to the noise preventing capacitor 55 in series simply and reliably by inserting the screw 52.

Embodiment 5

Figure 15:
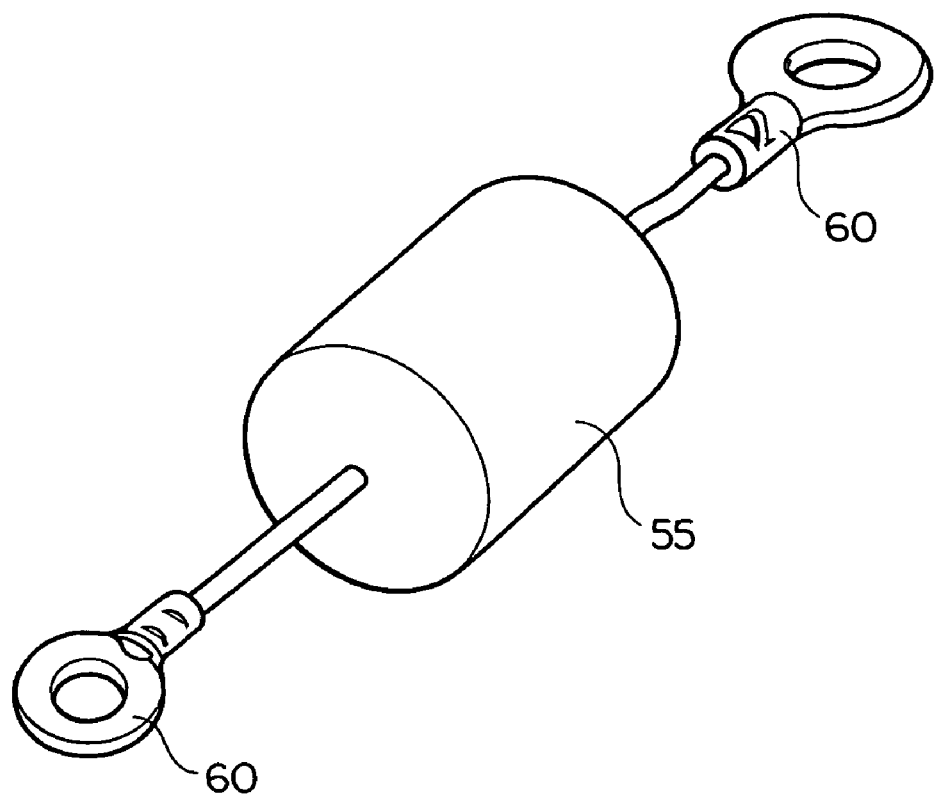
FIG. 15 is a partial perspective of an automotive alternator according to Embodiment 5 of the present invention.

FIG. 15 is a perspective of an alternator according to Embodiment 5 of the present invention.

In this embodiment, terminal fittings 60 lead out from two surfaces of a noise preventing capacitor 55. These terminal fittings 60 are fixed using screws 52 so as to be placed in surface contact with connecting wiring 53, but a resistive coating is formed on the contacting surfaces of the terminal fittings 60, which constitute a resisting means.

The rest of the configuration is similar to that of Embodiment 1.

This alternator has effects similar to those of the alternator according to Embodiment 1, and another effect is that the terminal fittings 60 can be connected to the noise preventing capacitor 55 in series simply and reliably by fixing them to the connecting wiring 53 using the screws 52.

Embodiment 6

In each of the above embodiments, an example has been explained in which a resisting means was connected to the noise preventing capacitor 55 in series, but in this embodiment, the noise preventing capacitor itself is a noise preventing capacitor that has an equivalent resistance value of 0.2 to 10.0 Ω, and is connected between the positive side and the negative side of the rectifier 14, and no resisting means is included. Moreover, in a similar manner to Embodiments 1 through 5, values of 0.5 to 3.5 μF are appropriate values for the electrostatic capacity of this noise preventing capacitor from the viewpoints of absorbing radio noise, and of cost and size.

Moreover, besides the resisting means explained in each of the above embodiments, a weld portion may also be used as a resisting means by welding the connecting wiring 53 and the noise preventing capacitor 55 using a brazing filler material in which a resistive powder has been mixed into a solder, for example, or nichrome wire may also be used, or a semiconductor resistor may also be used.

What is claimed is:

1. An automotive alternator comprising:
    a case;
    a rotor that is disposed inside said case and that is fixed to a shaft;
    a stator that is disposed so as to surround said rotor and in which alternating current arises by means of a rotating magnetic field from said rotor;
    a rectifier that is disposed at an end portion of said shaft and that rectifies said alternating current that arises in said stator into direct current;
    a dielectric capacitor that is connected between a positive side and a negative side of said rectifier and that absorbs noise that arises during rectification into direct current by said rectifier, and
    means for suppressing heat generation within said dielectric capacitor, comprising a resisting means that suppresses current that flows to said dielectric capacitor, connected to said dielectric capacitor in series, wherein the means for suppressing the heat generation is disposed outside of a voltage regulator included in the automotive alternator.

2. An automotive alternator according to claim 1, wherein said dielectric capacitor is disposed inside said case.

3. An automotive alternator according to claim 1, wherein said resisting means is disposed on a negative side of said dielectric capacitor.

4. An automotive alternator according to claim 1, wherein said resisting means is a cross section reduced portion in which a portion of connecting wiring that is connected to said dielectric capacitor is disposed so as to have a reduced cross-sectional area.

5. An automotive alternator according to claim 1, wherein said resisting means is a resistive coating that is disposed on an end portion of connecting wiring that is connected to said dielectric capacitor, and said resistive coating is in surface contact with said case.

6. An automotive alternator according to claim 1, wherein said resisting means is a resistive body that is held between an end of connecting wiring that is connected to said dielectric capacitor and said case.

7. An automotive alternator according to claim 1, wherein said resisting means is a terminal fitting that is connected to said dielectric capacitor and that has a resistive coating disposed on a surface.

8. An automotive alternator according to claim 1, wherein said dielectric capacitor has an electrostatic capacity of 0.5 to 3.5 μF.

9. An automotive alternator according to claim 1, wherein said resisting means has a resistance value of 0.2 to 10.0 Ω.

10. The automotive alternator according to claim 1, wherein the dielectric capacitor is connected to the stator only via the rectifier.

11. An automotive alternator comprising:
    a case;
    a rotor that is disposed inside said case and that is fixed to a shaft;
    a stator that is disposed so as to surround said rotor and in which alternating current arises by means of a rotating magnetic field from said rotor;
    a rectifier that is disposed at an end portion of said shaft and that rectifies said alternating current that arises in said stator into direct current; and
    a dielectric capacitor that is connected between a positive side and a negative side of said rectifier and that absorbs noise that arises during rectification into direct current by said rectifier,
    wherein said dielectric capacitor has an equivalent resistance value of 0.2 to 10.0 Ω,
    wherein the dielectric capacitor has the equivalent resistance value of 0.2 to 10.0 Ω without being connected to a resistor in series.

12. The automotive alternator according to claim 11, wherein the dielectric capacitor is connected to the stator only via the rectifier.

\* \* \* \* \*